Patented Jan. 31, 1950

2,495,756

UNITED STATES PATENT OFFICE 2,495,756

PROCESS OF NEUTRALIZING PECTINIC ACID

Harry S. Owens, Rolland M. McCready, and William D. Maclay, Berkeley, Calif., assignors to the United States of America as represented by the Secretary of Agriculture No Drawing. Application September 14, 1945, Serial No. 616,446

1 Claim. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to pectinic acids and has among its objects the provision of a process of neutralizing pectinic acids so as to render them more soluble and to permit their use in the preparation of certain gels without causing coagulation.

As used herein, "pectin" is defined as the familiar preparation of commerce or of the laboratory prepared from plant extracts by precipitation with alcohol, acetone, or metallic salts with no attempt to modify its natural methoxyl content. By "pectic acid" is meant a more or less completely demethoxylated pectin, and by "pectinic acid" is meant any one of a series of derivatives of pectin with methoxyl content intermediate between that of pectin and pectic acid. In the present application, the term "pectinic acid" is used generically to indicate either the acid itself or its salts.

In the manufacture of ordinary pectin (high-methoxyl pectinic acids), the pectin, which exists in the acid form in the strongly acidic extraction liquor, is partially neutralized to a pH of about 3.2, either in solution form prior to concentration, or in a semi-solid precipitated form suspended in an aqueous-organic solvent solution in which the pectin has a very low solubility. Among the reasons for this partial neutralization of pectin is the fact that pectins exhibit their highest stability at pH values of about 3.

Partial neutralization of low-methoxyl pectinic acids previously has been effected through adjustment of their solutions to a pH of about from 3.7 to 4.5 by adding ammonium hydroxide solution prior to precipitation with an organic solvent. Partial neutralization also has been effected through treatment of an aqueous-alcohol suspension of previously precipitated pectinic acid with ammonium hydroxide solution. However, these methods are costly, and the present invention provides a process which renders the original pectinic acid more soluble; permits the use of the neutralized product in the preparation of gels, for example, at pH's about 6.5 in milk products, without causing coagulation of the milk; and is much more economical in operation.

In a copending application entitled "Process of isolating low-methoxyl pectinic acids" (filed September 14, 1945, Serial No. 616,445, now Patent No. 2,448,818), a process is described for isolating low-methoxyl pectinic acids in the solid state in the form of the free acid. Neutralization of such pectinic acids by the process of the present invention yields products which, when placed into solution, will give pH values of about from 3.7 to 5, thereby rendering the neutralized pectinic acid more soluble than the original pectinic acid and permitting the use of these neutralized products in the preparation of gels, for example, at pH's about 6.5 in milk products, without causing coagulation of the milk.

According to the invention, pectinic acids in the solid state, which may be in ground, flake, and film form, are neutralized, either partially or completely, by contacting them with gaseous ammonia as the neutralizing agent. The original pectinic acid is in the substantially free-acid form, isolated as in the above-mentioned copending application, and while its moisture content may vary, it is preferable that the moisture content be about from 5 to 10 percent. The temperature of reaction also may vary, although it is preferable to conduct the reaction at room temperature.

The following examples are illustrative of the invention:

Example I

A low-methoxyl pectinic acid of 3.1 percent methoxyl content and an equivalent weight of about 250 was dried in vacuo at about 150° F. for about 15 hours. Fifty grams of this dried, ground pectinic acid was stirred for about two minutes in an atmosphere of ammonia gas. The sample weighed 51.2 grams after this treatment, and when dissolved in water to yield a 1 percent solution, had a pH of about 3.7.

Example II

Thirty grams of the untreated dried, ground, pectinic acid of Example I was stirred for about 10 minutes in an atmosphere of ammonia gas, the sample weighing 31.4 grams after this treatment. A 1 percent aqueous solution of the sample had a pH of about 7.0

Example III

Fifty grams of dried flakes of the untreated pectinic acid of Example I was stirred for about 5 minutes in an atmosphere of ammonia gas, the sample weighing 51.2 grams after this treatment. A 1 percent aqueous solution of the sample had a pH of about 3.8.

Example IV

Ten grams of air-dried pectinic acid, having 1.7 percent ammonia and 3.5 percent methoxyl content, was placed in a 50 milliliter chamber. The chamber was then evacuated, and 260 milliliters of ammonia gas was introduced. After about 30 seconds, the chamber was again evacuated. The product, upon analysis, showed 2.5 percent ammonia.

Example V

Forty grams of pectinic acid, having a 3.1 percent methoxyl content, was dried in vacuo at about 150° F. and then placed in an oven at about 158° F. Two liters of ammonia gas, which was introduced into the oven, was adsorbed in about 90 minutes. A 1 percent aqueous solution of the sample had a pH of about 4.4.

Example VI

Thirty grams of dried flakes of a low-methoxyl pectinic acid was partially neutralized while spread out in a thin layer in an enclosed container containing an open dish of ammonium hydroxide solution. A 1 per cent aqueous solution of the ground product had a pH of about 3.5.

Gaseous organic amines, such as methyl amines, primary and secondary ethyl amine, primary n-propyl amine, or other basic materials with boiling points not exceeding about 158° F., are the equivalent of ammonia and can be used in place of ammonia as the neutralizing agent.

Having thus described our invention, we claim:

A process of increasing the solubility of a low-methoxyl pectinic acid comprising contacting said low-methoxyl pectinic acid in the solid state with gaseous ammonia as a neutralizing agent at room temperature for from 30 seconds to 10 minutes, whereby said acid is neutralized.

HARRY S. OWENS.
ROLLAND M. McCREADY.
WILLIAM D. MACLAY.

REFERENCES CITED

The following references are of record in the file of this patent:

UNITED STATES PATENTS

| Number | Name | Date |
| --- | --- | --- |
| 2,233,574 | Baker et al. | Mar. 4, 1941 |
| 2,380,739 | Evans et al. | July 31, 1945 |